J. JOHNSON.
Road-Scraper.
No. 214,152. Patented April 8, 1879.
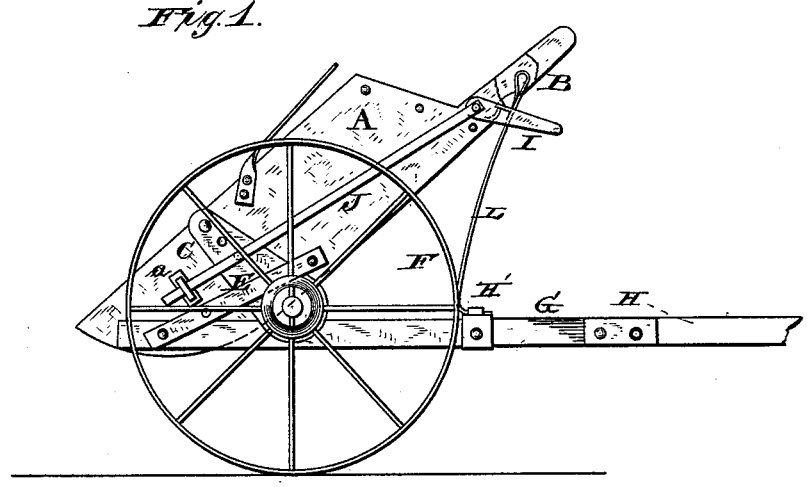
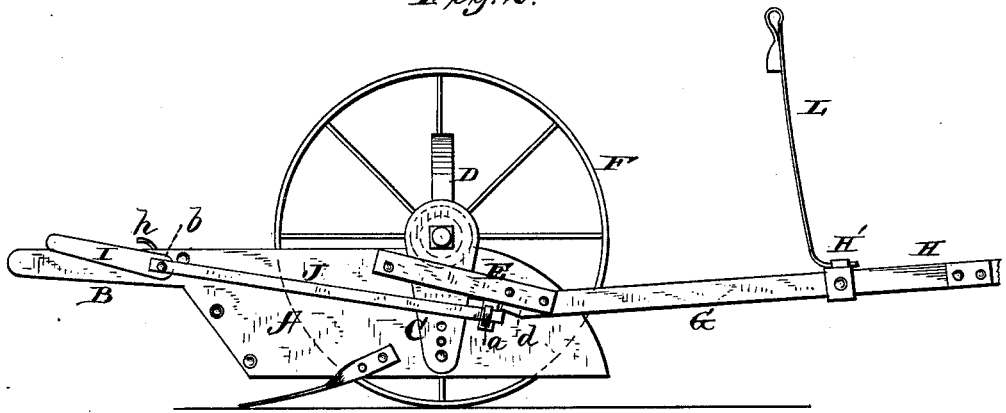

UNITED STATES PATENT OFFICE.

JEREMIAH JOHNSON, OF MOUNT PLEASANT, IOWA.

IMPROVEMENT IN ROAD-SCRAPERS.

Specification forming part of Letters Patent No. 214,152, dated April 8, 1879; application filed January 21, 1879.

*To all whom it may concern:*

Be it known that I, JEREMIAH JOHNSON, of Mount Pleasant, in the county of Henry, and in the State of Iowa, have invented certain new and useful Improvements in Road-Scrapers; and do hereby declare that the following is a full, clear, and exact description thereof, reference being had to the accompanying drawings, and to the letters of reference marked thereon, making a part of this specification.

The nature of my invention consists in the construction and arrangement of a road-scraper, as will be hereinafter more fully set forth.

In order to enable others skilled in the art to which my invention appertains to make and use the same, I will now proceed to describe its construction and operation, referring to the annexed drawings, in which—

Figure 1 is a side elevation of my scraper in a reversed position. Fig. 2 is a similar view thereof, showing the scraper when loaded.

A represents the scraper, constructed in the usual manner, and provided with suitable handles B, for manipulating the same.

The scraper A is pivoted in and suspended from two bars or plates, C C, which extend upward through guards E, and a suitable distance above the scraper. Through the upper ends of these plates or bars is passed the arched axle D, having the driving-wheels F F on its ends. The scraper is thus suspended below the axle, and the distance from the axle to the scraper can be regulated by changing the pivots of the scraper in the plates in different holes.

Near the front end to each side of the scraper is pivoted a brace or bar, G, which extends forward and then inward, being attached to the tongue H and its cross-bar H'.

Each bar G extends a short distance in rear of its pivot, as shown at $d$, to form a clutch or lock, as hereinafter described.

Through the handles B, immediately in rear of the scraper, is a shaft, $b$, extending from side to side, and having upon each end a lever, I, secured to it.

To the lower end of each lever I is pivoted a bar, J, which extends along the side of the scraper and through a guard, $a$, secured thereto. This bar J may, by means of the lever I, be moved forward sufficiently far to pass under the rear end, $d$, of the bar G, as shown in Fig. 2.

When the scraper is in operation the levers I are raised, drawing the bars J back, when the scraper can easily be handled by the operator to scrape deep or shallow, as desired. When the scraper is loaded the levers I are thrown backward, which throws the bars J forward, closing the clutches, when the scraper is held rigid.

For dumping the scraper the clutch is released or opened, and the rear of the scraper lifted, so that its front edge will catch on the ground, when a slight forward movement of the beam will cause the scraper to turn over, dumping the load. The scraper is then reversed or thrown entirely over until a projection, $h$, on its rear edge is caught by a spring-catch, L, secured on the tongue, whereby the scraper is held in the reversed position while driving back to the work.

It will be noticed that during the operation of loading and dumping the scraper not only can turn on its pivots in the bars C C, but these bars also swing a limited distance in the guards E on the axle, giving the scraper sufficient play to accommodate itself to the varying manipulations required.

I am aware that a road-scraper is not new in which the bail end is curved and provided with holes, into which sliding spring-rods project, said spring-rods being operated by fulcrumed lever-rods, with catches engaging with notched castings at the rear part of the scraper, and I do not claim such as my invention; but in such case this engagement of the sliding locking-bars is made after the scraper has been loaded, and it is desired to revolve the scraper and dump the load, while in my case this engagement is only made when it is desired to transport the loaded scraper, and the locking-bars must be withdrawn before the scraper can be dumped.

Having thus fully described my invention, what I claim as new, and desire to secure by Letters Patent, is—

1. The combination of the scraper A, adjustably pivoted in the plates or bars C C, the axle D, and the wheels F F, substantially as and for the purposes herein set forth.

2. The combination of the scraper A, braces G, having rear projecting ends or clutches, d, the clutch-bars J, and the levers I, substantially as and for the purposes herein set forth.

In testimony that I claim the foregoing I have hereunto set my hand this 13th day of January, 1879.

JEREMIAH JOHNSON.

Witnesses:
  W. S. BABB,
  JNO. S. WOOLSON.